W. G. STEBBINS.
THRUST BEARING.
APPLICATION FILED JULY 18, 1910.
989,203.
Patented Apr. 11, 1911.
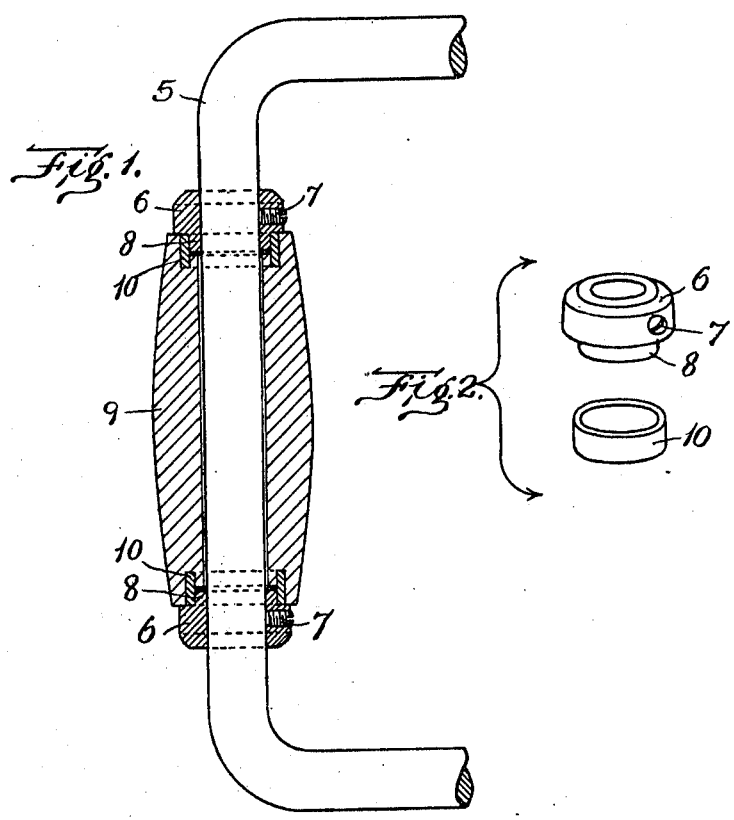

UNITED STATES PATENT OFFICE.

WILLIAM G. STEBBINS, OF MONTAGUE, MASSACHUSETTS, ASSIGNOR TO MILLERS FALLS CO., OF MILLERS FALLS, MASSACHUSETTS, A CORPORATION OF MASSACHUSETTS.

THRUST-BEARING.

989,203.      Specification of Letters Patent.      Patented Apr. 11, 1911.

Application filed July 18, 1910. Serial No. 572,413.

*To all whom it may concern:*

Be it known that I, WILLIAM G. STEBBINS, of Montague, in the county of Franklin and State of Massachusetts, have invented certain new and useful Improvements in Thrust-Bearings, of which the following is a specification.

This invention relates to thrust bearings and has particular reference to handles of the type which are rotatively mounted upon a portion of a tool stock, the hand piece being usually of wood and having a longitudinal bore for the stock upon which it rotates, this type of handle being very commonly employed upon the cranks of bit braces. Frequently heretofore handles of this type wear so that they become loose longitudinally and cause some rattling, and the wood hand pieces frequently shrink so as to bind upon the stock.

The object of my invention is to provide a thrust bearing especially adapted for handles of tools of the character described in which the wood hand piece will be so supported by end bearings that it will always revolve freely and also without any looseness.

To these ends the invention consists in the construction substantially as hereinafter described and claimed.

Of the accompanying drawings which form a part of this specification,—Figure 1 is a longitudinal section of a handle embodying my invention and applied to the crank of a bit brace. Fig. 2 shows one of the end bearings and hand piece ferrule separated and in perspective.

Similar reference characters indicate like parts in both figures.

A portion of the crank arm of a bit brace is indicated at 5 and to said crank arm are secured two thrust bearings 6, which are usually of steel or iron, said bearings being secured in longitudinal positions upon the crank arm 5, by set screws 7. Each bearing is formed with a shoulder 8, which is preferably cylindrical. The wood hand piece 9 has a brass ring 10, driven into it at each end, the wood of the handle, however, being cut away sufficiently to expose enough of the inner wall or face of each ring 10 to receive the shoulder 8 of the adjacent bearing. The outer ends of the two rings 10 bear against the opposing faces of the two bearings 6, the latter therefore constituting end thrust bearings for the hand piece. Inner faces of the rings 10 run upon the cylindrical portions of the shoulders 8 of the bearings, and therefore, the members 6 with their shoulders 8, constitute both end thrust and lateral bearings for the hand piece. Incidentally, the rings 10, being set into the wood, prevent the latter from splitting. Owing to the lateral support for the handle provided by the shoulders 8 extending into the rings 10, the hole in the wood hand piece is not relied upon at all for the bearing of said hand piece. Consequently, the hole in the wood can be made sufficiently large so that there can be no possibility of the hand piece binding on the rod or stock in case the hand piece shrinks or warps. Of course, when an adjustment is needed, only one of the set screws 7 requires to be loosened and the bearings set up and the screw again tightened. Both of the end thrust bearings, however, may be set up, if desired.

The reason for making the rings 10 of brass, while the bearings and projecting portions or shoulders are made of steel or iron, is to avoid rusting together.

It is to be understood that I do not limit myself to this structure of handle in connection with a bit brace, as it may be employed wherever a wood hand piece is to be rotatively mounted upon a rod or tool stock. Therefore the portion 5 of the bit brace crank arm may be referred to as a rod, and the hand piece 9 as a sleeve mounted on said rod.

I claim—

1. The combination with a rod, of a sleeve thereon, said sleeve having a metal ring at each end, and bearings for said rings, said bearings being fixedly connected to the rod and having portions engaging both end and side faces of said rings, one of said bearings being adjustable relatively to the other.

2. The combination with a rod, of a sleeve thereon, said sleeve having a cylindrical brass ring set into each end, portions of the inner faces of said rings being exposed, and end bearings for said rings, said bearings being fixedly connected to the rod and having cylindrical projections or shoulders on which the said exposed portions of the rings bear, means being provided for adjusting the distance between the two end bearings.

In testimony whereof I have affixed my signature, in presence of two witnesses.

WILLIAM G. STEBBINS.

Witnesses:
 LIZZIE STRACHAN,
 HARRIET M. DUDLEY.

Copies of this patent may be obtained for five cents each, by addressing the "Commissioner of Patents, Washington, D. C."